March 7, 1933.  P. J. N. MILLER ET AL  1,900,249
ELECTRIC TOASTER
Filed Nov. 7, 1928   6 Sheets-Sheet 4

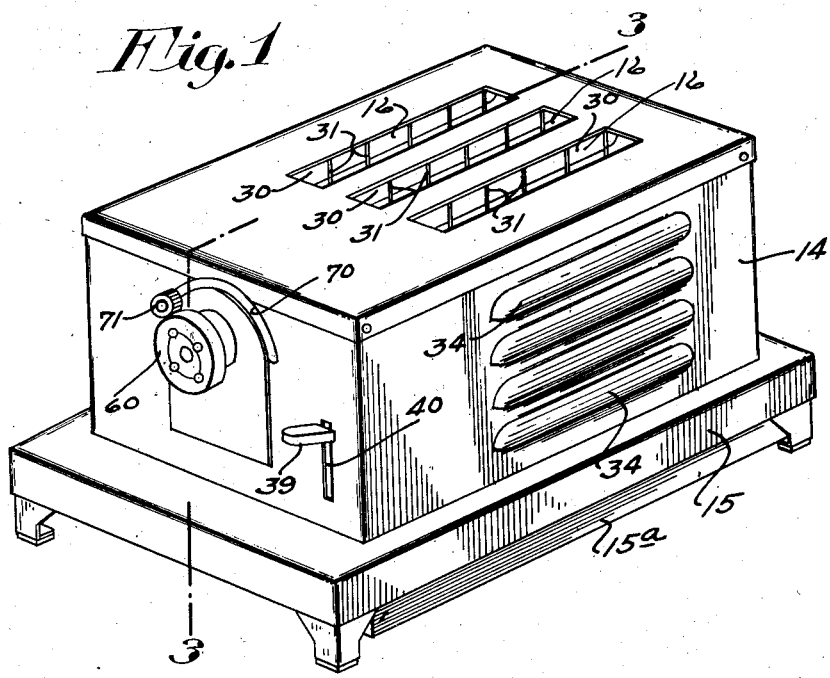
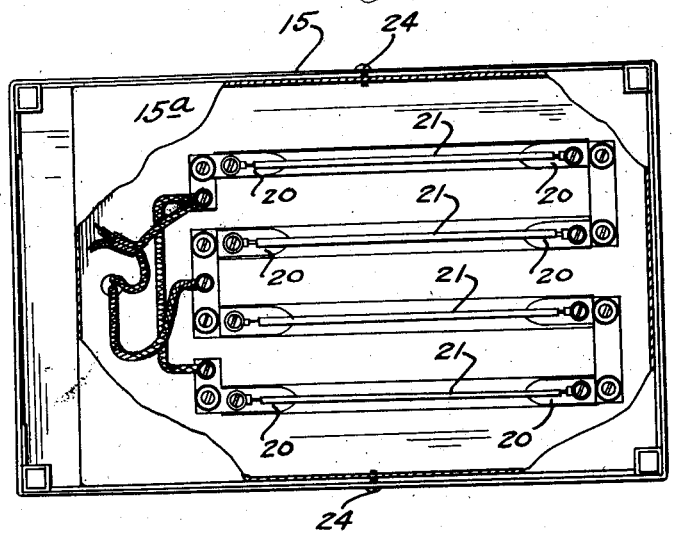

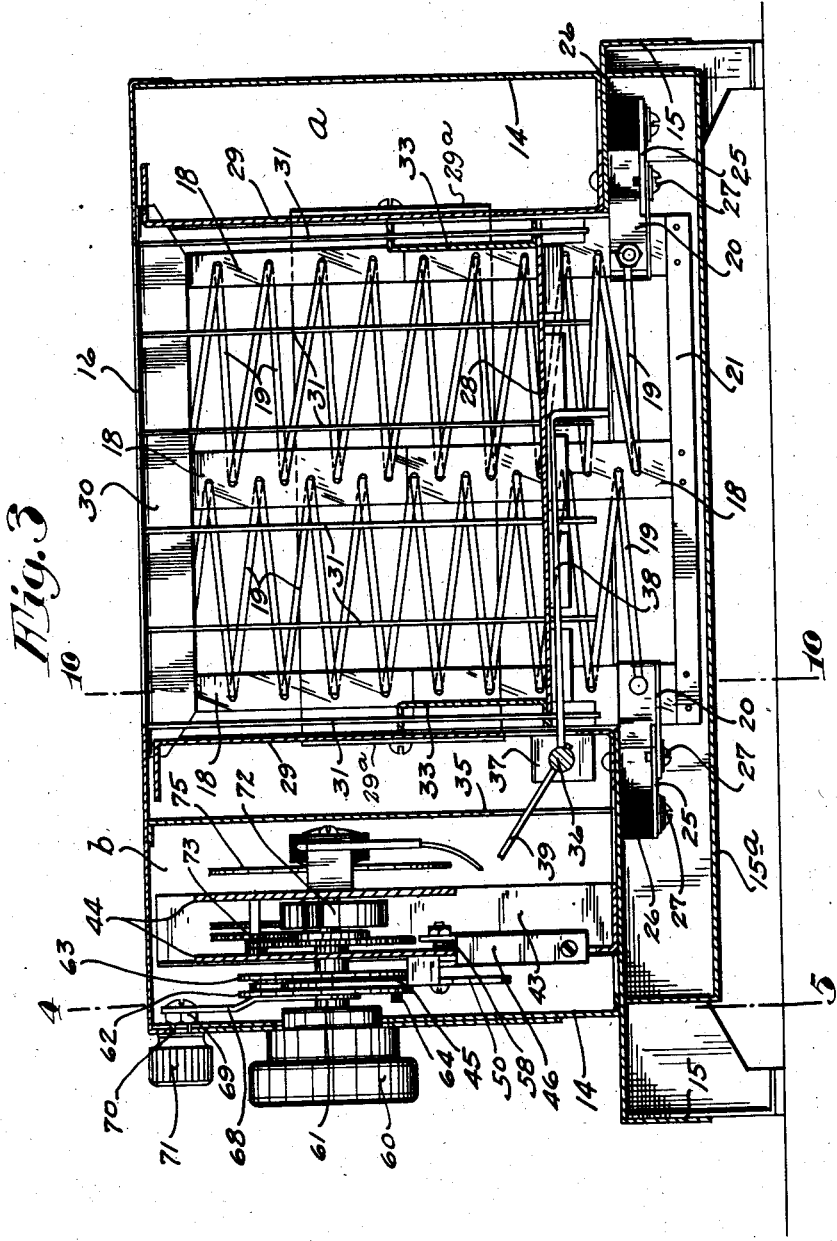

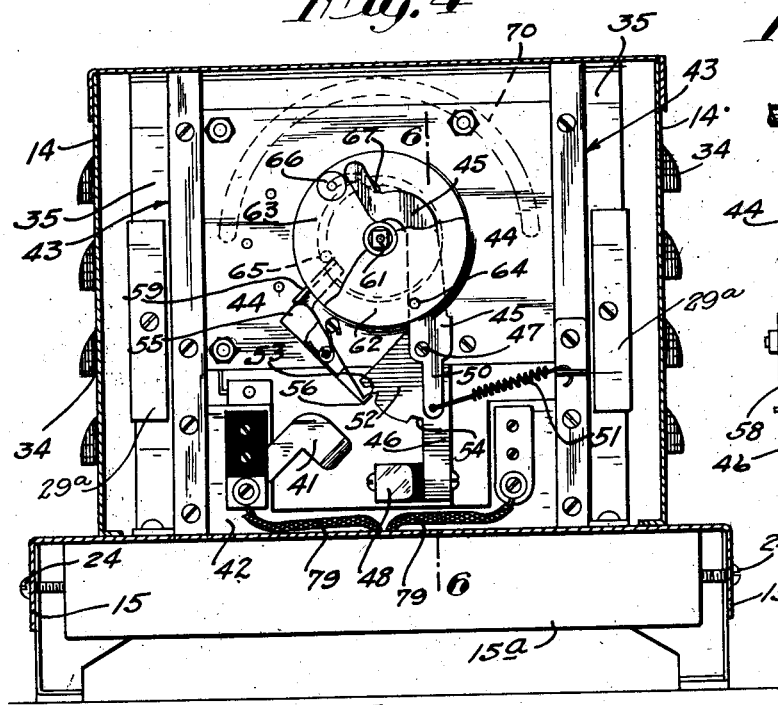
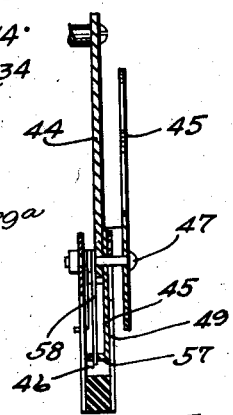
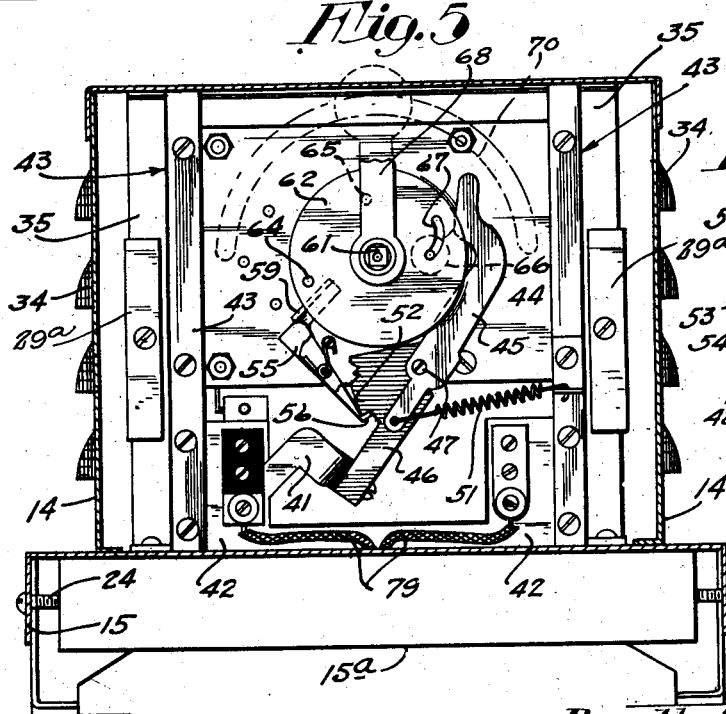
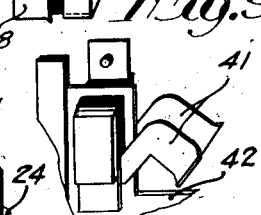

Inventors
Peter J. N. Miller
Victor E. Extrom
By their Attorneys
Merchant and Kilgore March 7, 1933.  P. J. N. MILLER ET AL  1,900,249
ELECTRIC TOASTER
Filed Nov. 7, 1928  6 Sheets-Sheet 5

Inventors
Peter J. N. Miller
Victor E. Extrom
By their Attorneys
Merchant and Kilgore

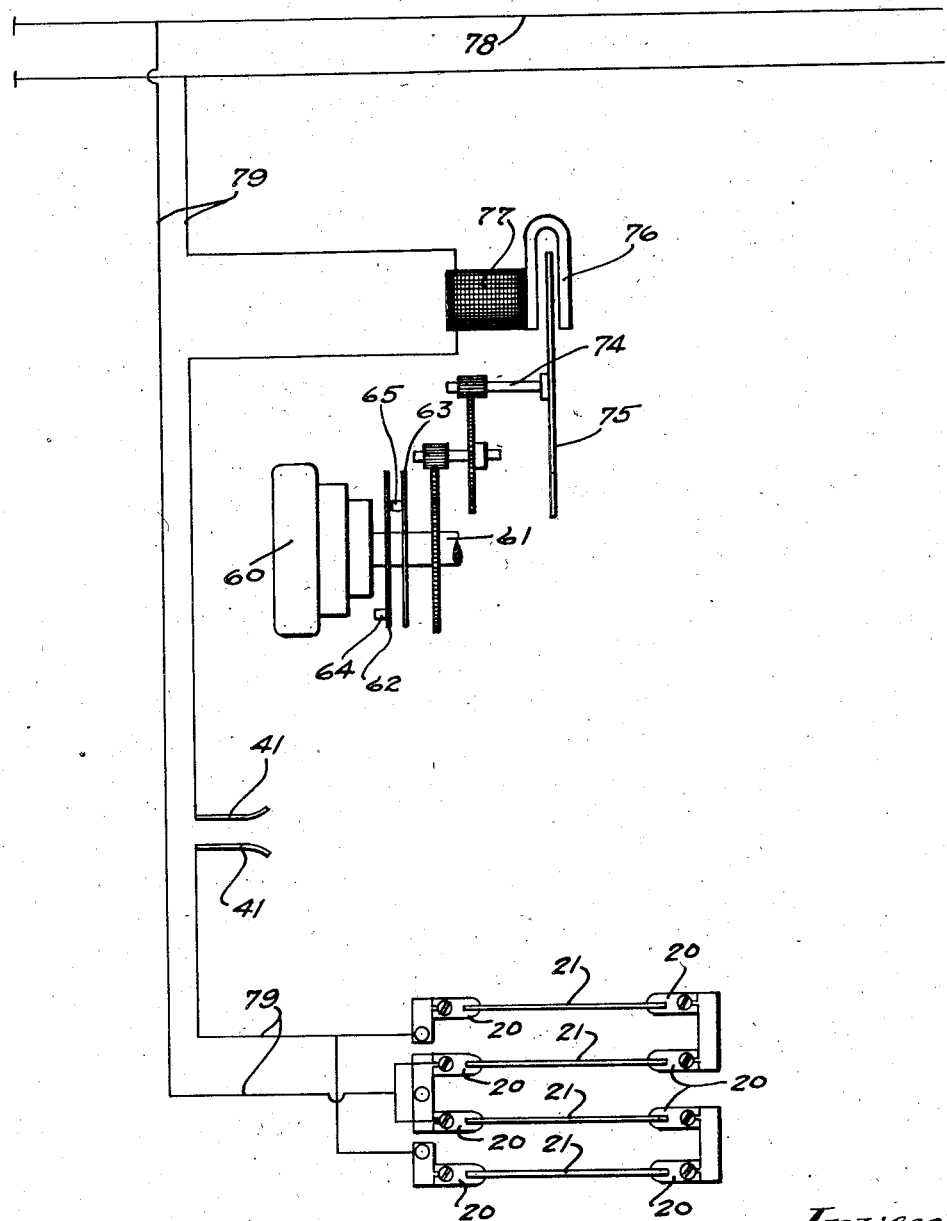

Patented Mar. 7, 1933

1,900,249

UNITED STATES PATENT OFFICE

PETER J. N. MILLER AND VICTOR E. EXTROM, OF MINNEAPOLIS, MINNESOTA

ELECTRIC TOASTER

Application filed November 7, 1928. Serial No. 317,702.

Our invention relates to electrical toasters and is directed to the improvement thereof in the several particulars hereinafter described; and the invention consists of the novel devices, combinations of devices and arrangement of parts defined in the claims.

A commercial form of the improved toaster is illustrated in the accompanying drawings wherein like characters indicate like parts throughout the several views.

Referring to the drawings:

Fig. 1 is a perspective showing the improved toaster;

Fig. 2 is a bottom plan view of the toaster with some parts broken away and some parts sectioned;

Fig. 3 is a vertical section taken on the line 3—3 of Fig. 1;

Figs. 4 and 5 are sections taken approximately on the line 4—5 of Fig. 3, but illustrating different positions of certain of the parts;

Fig. 6 is a detail in section taken approximately on the line 6—6 of Fig. 4;

Figs. 7 and 8 are details in perspective showing, respectively, the upper and lower parts of the master switch lever;

Fig. 9 is a detail in perspective showing the relatively fixed part of the master switch;

Fig. 14 is a diagrammatic view illustrating the circuit connections and certain other parts of the device.

The various parts of the devices are contained within a box-like casing 14 and a box-like base 15, the former of which is rigidly connected to the latter, and both of which are shown and preferably are of sheet metal. The device shown is designed to simultaneously toast three slices of bread and hence four electric heating elements are provided. These heating elements are spaced in parallel arrangement within the casing 14; and between the said heating elements, the top of the casing 14 is provided with elongated bread passages 16, while the top of the base 15, which constitutes the bottom of the casing 14 is provided with elongated passages 17 through which the electric heating elements are projected from the base upwardly into the casing.

Figure 12:
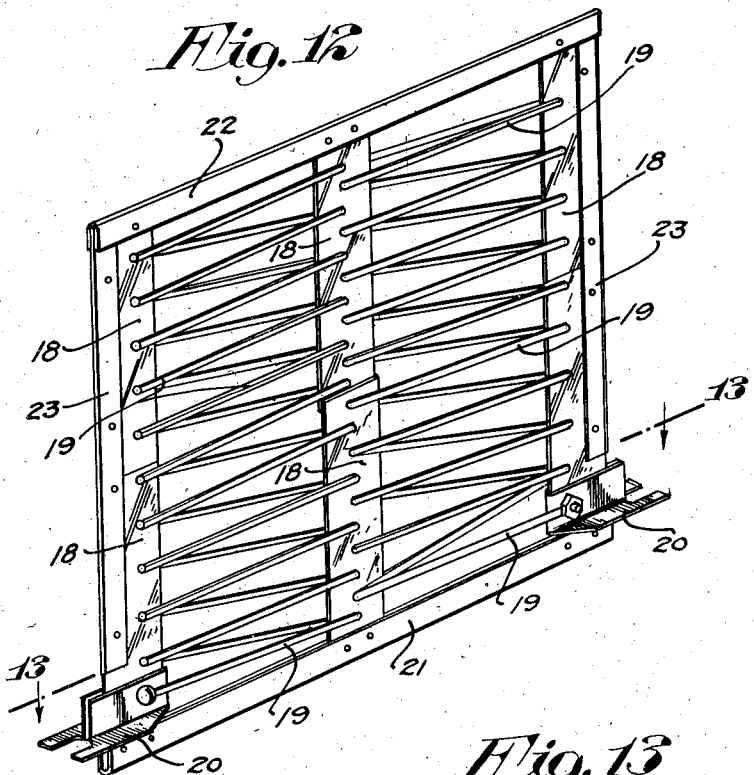
Fig. 12 is a perspective showing one of the electrical heating elements removed from working position.
Figure 13:
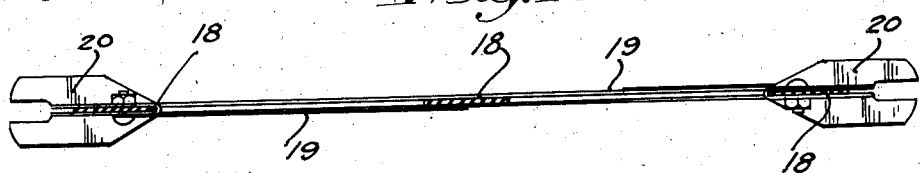
Fig. 13 is a horizontal section taken on the line 13—13 of Fig. 12.

The electric heating elements, one of which is shown in detail in Figs. 12 and 13, are of novel construction and as preferably designed, each comprises three vertical strips 18 of insulating material such as mica, longitudinally spaced so that the heating element is open at both sides.

The wires 19 of the heating elements are threaded back and forth through the mica strips 18 and their terminals are electrically connected to metallic contact clips 20 shown as applied to the lower portions of outer strips 18. At their lower ends, the strips 18 are secured to thin sheet metal channel strips 21 which, however, are spaced from and out of engagement with the contact clips 20, as shown in Fig. 3. At their upper ends, the strips 18 are tied back by a similar metallic strip 22. The outer strips 18 are re-enforced by similar folded metal strips 23 which also are spaced from and out of engagement with the contact clips 20. Of course, also the wire 19 is out of engagement with all of the metallic elements except the clips 20.

With the metallic re-enforcements illustrated, it is feasible to use short narrow pieces of mica to make up the complete strips 18 and this, of course, materially reduces the cost of the heating element for it is a known fact that the cost of large pieces of mica is very much greater than the cost of the same amount of mica in small pieces, and moreover, even the aggregate amount of mica necessary is very small in the heating elements described.

The above described heating elements are made readily removable, but for the application or removal thereof a pan 15ª which forms the bottom to the base 15 and is normally held in place by screws 24, must be removed. When this is done, the heating element is inserted upward through the slots 17 until the pronged ends of the contact clips 20 are engaged with fixed contacts 25 that are secured to insulation blocks 26 applied to the top of the base 15. The clips 20 are shown as detachably secured to the contacts 15 by screws 27.

Figure 10:
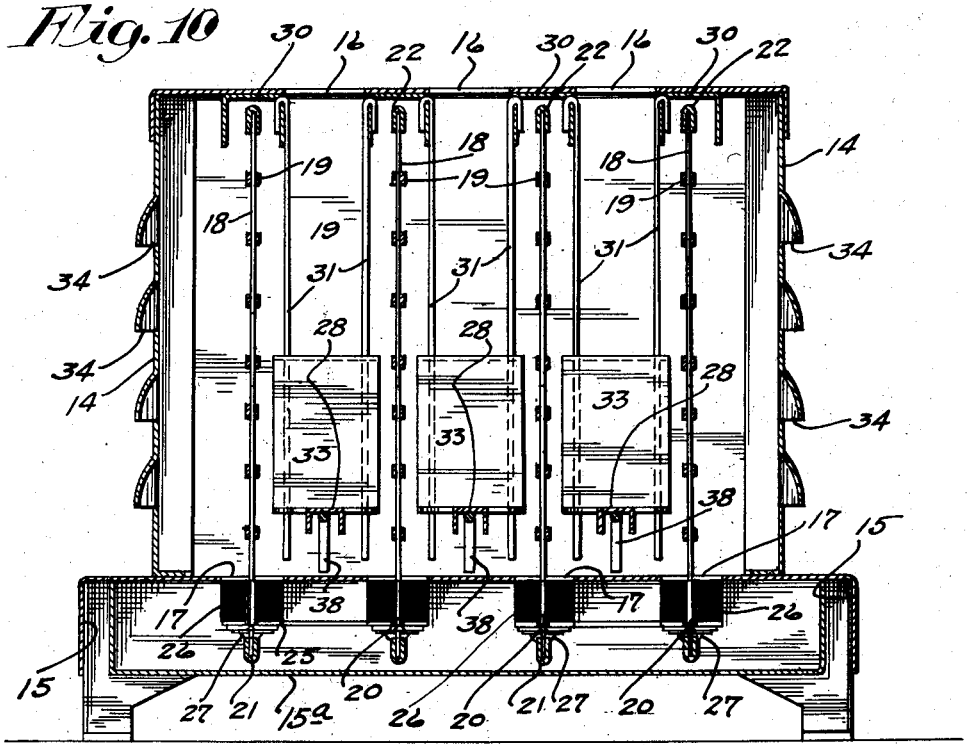
Fig. 10 is a transverse vertical section taken approximately on the line 10—10 of Fig. 3.
Figure 11:
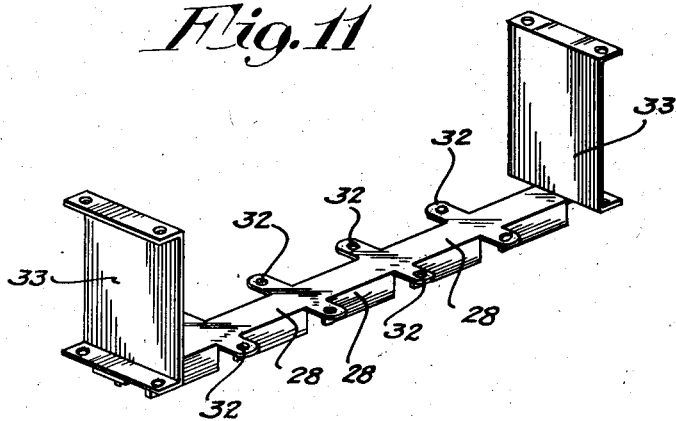
Fig. 11 is a perspective showing one of the toast-holding racks.

The slices of bread inserted through the opening 16 will rest on vertically movable racks 28 preferably of the construction shown in detail in Fig. 11. Secured onto the base 15 and rising within the casing 14 in front and at the rear of the heating elements are metallic plates 29 which, at their upper edges rigidly support transverse light metallic channel strips 30. The channel strips 30 are located one over each heating element with their depending flanges on opposite sides of said elements and these depending flanges support the upper ends of vertical rods 31, the lower ends of which, as shown, are inserted through perforated lugs 32 on the racks 28 and through perforated flanges of end plates 33 which latter are rigidly secured to the ends of the respective racks. The rods 31, therefore, afford vertical guides for the racks, and confining bars for holding the bread properly spaced from the heating elements. The sides of the casing 14, as shown, are provided with ventilating passages 34 which permit a limited circulation of air through the casing so as to carry off the gases during the toasting operation. Here it may be further noted that in the structure illustrated, the casing 14 is, by a partition plate 35, divided into toasting compartment or oven $a$ and the time mechanism compartment $b$.

By reference to Figs. 3, 4 and 5, it will be noted that baffle plates 29$^a$ are secured to the metallic plates 29 and extend on opposite sides of the several heating elements, leaving air passages to the bread chambers both above and below said baffle plates and when these baffle plates are properly set, they will distribute the passage of air so that just the proper toasting action at top and bottom of the toast will be produced.

In this device, the toast is not automatically ejected from the oven, but an efficient device for manually ejecting the same is provided. This ejecting device comprises a rock shaft 36, as shown, that is mounted in bearings 37 on the adjacent plate 29, see Fig. 3. This rock shaft 36 has lifting arms 38 that project one under each rack 28 so that when the rock shaft 36 is oscillated in a counter-clockwise direction in respect to Fig. 3, the several racks will be lifted on the guide rods 31 so as to project the toast well out of the casing so that the toast may be readily gripped and completely removed by hand. For oscillating the shaft 36 it is shown as provided with an operating lever 39 that projects through a slot 40 in the front of the casing 14, see Fig. 1, where it may be readily engaged by a finger and depressed.

Except for means to control the current supply to the heating elements, the device so far described is a complete operative device, and hence, at this point, a brief description of the operation thereof will be given as follows:

The slices of bread to be toasted are inserted through the opening 16 in the top of the casing and are dropped onto the respective racks 28. Each of the several slices of bread will be exposed on both sides to radiated heat from the heating elements. Inasmuch as the insulation between the wire of the heating elements is removed or omitted, each and every wire of each heating element is permitted to radiate heat at both sides of the heating element, and moreover, there is a free circulation of hot air around and between the wires of the heating elements so that the toasting action will be very rapid and its efficiency will be substantially doubled over that of an ordinary heating element in which there is insulating material between the coils of the elements.

To project the toast from the oven or toasting chamber it is, as already indicated, only necessary to depress the lever 39, thereby raising the several racks and projecting the toast above the casing so that it may be readily engaged and completely removed by hand. The heating elements described are also of such character so that they may be very readily and easily replaced at any time it becomes necessary.

In this improved toaster, the toast is not automatically projected from the oven, but there is provided an automatic timed switch mechanism adapted to be set for various times of action and which, at the completion of the interval for which it is set, will automatically open the circuit or cut off the supply of current to the heating elements. This time switch mechanism, the preferred form of which is illustrated in the drawings, is located within the chamber $b$ of the casing 14 and, as illustrated, comprises as follows:

The elements that make up the so-called master switch are shown in detail in Figs. 7, 8 and 9, and in operative positions in Figs. 4 and 5, but see also Fig. 3. Said master switch comprises laterally spaced fixed contacts 41 that are insulated from each other and from the metallic parts of the device and, as shown, are supported from a flange 42 of an upright frame 43 that is secured within the compartment $b$ and comprises also laterally spaced bearing plates 44.

The complete circuit for the heating elements will be traced later on, but for the time being it will simply be stated that said circuit will be closed when and only when an electrical connection is made between said relatively fixed contacts 41.

The movable part of the master switch is made up of two pivotally connected members which may be designated as primary and secondary lever members, shown in detail, respectively, in Figs. 7 and 8 and respectively indicated as entireties by the numerals 45 and 46. These two members are pivoted at 47 on one of the bearing plates 44 and the member 46 carries an electrical contact 48 that is insulated therefrom, but is adapted to engage between the contacts 41 to close the circuit through the heating elements. The lever 45 carries an eccentric cam segment 49 and has a depending arm 50. A coiled spring 51 anchored to the frame 43 and attached to the arm 50 tends to move the lever 45 in a counter-clockwise direction. Lever 46 carries a latch segment 52 provided with spaced latch notches 53 and 54. Pivoted to one of the bearing plates 44 is a lever latch 55 that is spring pressed to move in a counter-clockwise direction in respect to Figs. 4 and 5, and is provided at its lower end with a latch lug or projection 56 that normally engages the notch 53 of lever 46 and holds the same as shown in Fig. 4.

By reference particularly to Figs. 6 and 8, it will be noted that the lever 46 is a channel-shaped member and that the segment 49 of lever 45 has a depending portion with an offset lug 57 that works between the side flanges of said lever 46. Here it should also be noted that a light torsion spring 58 applied around the pivot bolt 47 reacts against the lug 57 and against one arm of the lever 46 and tends to move lever 46 in a clockwise direction in respect to lever 45, directions being taken by reference to Figs. 4 and 5 and the purpose of which movement will presently appear.

It is also important to note that the lug 57 in the position of the parts shown in Figs. 4 and 5, engages against the back of the channel of the lever 46 so that when lever 45 moves from the position shown in Fig. 5 into the position shown in Fig. 4, it will carry with it lever 46. In advance, it may be stated, however, that this movement of the two levers from the position shown in Fig. 5 into the position shown in Fig. 4, cannot take place until latch 55 is released from the notch 54 of segment 52 of said lever 46. At this point, it should be stated that the lug 56 of latch 55 is of such width that it will be engaged not only with the segment 42 of lever 46, but also by cam surface 49 of lever 45. Latch 55 is provided with an offset tripping arm 59, see Figs. 4 and 5.

For setting the switch-tripping mechanism for timed action, there is provided a knob or hand-piece 60 provided with a shaft 61 shown as journaled in the bearing plates 44. This shaft 61 carries a pair of laterally spaced but quite closely positioned discs or pin bearing members 62 and 63 that are provided, respectively, with laterally projecting pin-like lugs or projections 64 and 65, see particularly Figs. 3 and 14. For action on the free upper end of lever 45 there is provided a lever-setting device preferably in the form of a roller 66, see Figs. 4 and 5, that is formed with trunnions arranged to work in eccentric cam grooves 67 formed in the two discs 62 and 63 at which the said rollers confine. Also it will be noted that the upper portion of the lever 45 works freely between the two discs 62 and 63. The operation of this roller on the lever 45 will be stated in the description of the operation.

The pin or lug 64 on the disc 62 is arranged to work against an adjustable stop which, as shown, is in the form of a stop lever 68 pivoted on the shaft 61 and provided at its free end with a projecting threaded stud 69 that works through a segmental slot 70 in the front of the casing 14 and is provided with a thumb nut 71 which, when tightened, holds said lever in predetermined adjustment. If desired, the casing adjacent to the slot 70 may be graduated to indicate different positions of the stop lever 68. The shaft 61 and parts carried thereby are under strain to rotate in a counter-clockwise direction in respect to Figs. 4 and 5 from a clock spring 72, see Fig. 3, connected to said shaft through a chain of gears of the clock type, indicated as an entirety by the numeral 73, and including a shaft 74. The shaft 74 is one of the high speed shafts of the clockwork and carries a metallic disc 75, best shown diagrammatically in Fig. 14. The disc 75 works between the pole posts 76 of an electro-magnet 77 and co-operates with said magnet or pole to dampen, retard or hold back the movement of the shaft 61 under the action of the spring 72.

Having now described the mechanism, the wiring thereof which is diagrammatically shown in Fig. 14, may now be noted as follows: From supply line 78, lead wires 79 are connected to the coils or wires 19 of several heating elements and in one of these leads 79, the magnet 77 and the hereinafter described relatively fixed contacts 41 of the master switch are interposed or connected in a series. Of course, this wiring may be varied but the scheme illustrated in Fig. 14 is that which is now employed.

Fig. 4 shows the parts in normal positions, that is, in positions that they will occupy immediately after the master switch has been tripped and moved into an open position. When the circuit to the heating elements is to be closed and set for timed action, the operator, by turning the knob 60 in a clockwise direction in respect to Fig. 4, rotates shaft 61 and parts carried thereby against the tension of the spring 72 until pin 64 of disc 62 is engaged against the stop arm 68 and then said knob is released. The above described movement of the disc 62 and other parts just noted causes the roller 66 to engage the upper end of switch member 45 and move the same into the position shown in Fig. 5. When primary switch member 45 is moved as just stated, secondary switch member 46 does not immediately move therewith because it is normally held by latch 55, but as lever 45 nearly reaches the position shown in Fig. 5, its cam surface 49 acting on the latch lug 56, forces latch into releasing position and thereupon the spring 58 with a very quick action, throws member 46 to its circuit closing position shown in Fig. 5. This quick action avoids sparking between the contacts. When member 46 reaches its circuit-closing position shown in Fig. 5, lug 56 of latch 55 engages notch 54 of member 46 and temporarily latches the same in its circuit-closing position.

When knob 60, after having been set as above stated, is released, motor spring 72 starts the movement of the clock mechanism and slowly rotates the shaft 61 and parts carried thereby in a counter-clockwise direction, the movement being retarded by the action of the magnet 76 on the retarding disc 75. When the mechanism has run for a certain interval of time, predetermined by the setting of the stop 68, pin 65 of disc 63 will engage arm 59 of latch 55 and cause said latch to release switch member 46, whereupon spring 51 will instantly throw the switch members 45 and 46 back to circuit opening position shown in Fig. 4.

Under the movement just described, it will be understood in statements already made, lug 57 of switch member 45 engages the channel-back of member 46 and positively forces member 46 to move with member 45 from position shown in Fig. 5 into position shown in Fig. 4. Here attention is called to the fact that when roller 66 is moved in a clockwise direction past the bulged portion of switch member 45, as shown in Fig. 5, it is cammed inward by the eccentric slots 67 so that under counter-clockwise movement, said roller will clear and not act upon said member 45.

From what has been said, it will be understood that the device described and illustrated in the drawings is capable of various modifications as to detail construction and arrangement of parts all within the scope of our invention as herein disclosed and claimed.

What we claim is:

1. In an electric toaster, a casing, electric heating elements within said casing spaced to afford bread-receiving chambers therebetween, said casing including vertically extended end plates adjacent to vertical edges of said heating elements, and baffle plates secured to said end plates spaced from the bottom and top of said casing and extended adjacent the sides of said heating elements and regulating the flow of air upward through the bread-receiving chambers.

2. The structure defined in claim 1 in which the electrical heating elements are located between said baffle plates and extend both above and below said baffle plates.

In testimony whereof we affix our signatures.

PETER J. N. MILLER.
VICTOR E. EXTROM.